United States Patent
Ma et al.

(10) Patent No.: US 8,843,128 B2
(45) Date of Patent: Sep. 23, 2014

(54) ROAMING SESSION TERMINATION TRIGGERED BY ROAMING AGREEMENT/PARTNER DELETION

(75) Inventors: Haiqing M. Ma, Nepean (CA); Sachin J. Lalseta, Ottawa (CA); Robert A. Mann, Carp (CA); Lui Chu Yeung, Kanata (CA); Partoo Mohebi-Sarmadi, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 325 days.

(21) Appl. No.: 13/275,465

(22) Filed: Oct. 18, 2011

(65) Prior Publication Data
US 2013/0095827 A1    Apr. 18, 2013

(51) Int. Cl.
| | |
|---|---|
| H04W 4/00 | (2009.01) |
| H04W 8/02 | (2009.01) |
| H04W 4/14 | (2009.01) |
| H04M 15/00 | (2006.01) |
| H04W 8/12 | (2009.01) |
| H04W 4/24 | (2009.01) |
| H04L 29/08 | (2006.01) |
| H04L 12/14 | (2006.01) |
| H04W 76/02 | (2009.01) |
| H04W 8/18 | (2009.01) |

(52) U.S. Cl.
CPC ............... *H04W 8/02* (2013.01); *H04W 76/02* (2013.01); *H04W 4/14* (2013.01); *H04M 15/66* (2013.01); *H04M 15/52* (2013.01); *H04M 15/00* (2013.01); *H04W 8/12* (2013.01); *H04W 4/24* (2013.01); *H04M 15/8038* (2013.01); *H04L 67/143* (2013.01); *H04M 15/51* (2013.01); *H04L 12/14* (2013.01); *H04L 12/1407* (2013.01); *H04W 8/18* (2013.01)

USPC ............... 455/433; 455/432.1; 455/432.3; 455/413; 455/415; 455/406

(58) Field of Classification Search
USPC ............ 455/433, 132.1, 432.3, 413, 415, 406, 455/456.1; 370/230, 235, 395.21
See application file for complete search history.

(56) References Cited

U.S. PATENT DOCUMENTS

2009/0264096 A1 * 10/2009 Cai et al. .................. 455/406

FOREIGN PATENT DOCUMENTS

| WO | 2009115015 A1 | 9/2009 |
|---|---|---|
| WO | 2010034195 A1 | 4/2010 |
| WO | 2010133239 A1 | 11/2010 |

OTHER PUBLICATIONS

3GPP TS23.203 V8.3.1 (Sep. 2008) available at http://www.3gpp.org/ftp/Specs/html-info/23203.htm.*
3GPP TS29.215 V10.2.0 (Jun. 2011) available at http://www.3gpp.org/ftp/Specs/html-info/29215.htm.*

(Continued)

*Primary Examiner* — Manpreet Matharu
(74) *Attorney, Agent, or Firm* — Kramer Amado P.C.

(57) ABSTRACT

Various exemplary embodiments relate to a method performed by a policy and charging rules node (PCRN) for processing a change in a status of a roaming partner, the method including: receiving, at the PCRN, a message indicating a change in a status of the roaming partner; identifying roaming subscriber sessions associated with the roaming partner; determining home based roaming subscriber sessions among the identified subscriber sessions; marking the determined home based roaming subscriber sessions for termination; and sending a termination message to a policy and charging enforcement node for the determined home based roaming subscriber sessions.

19 Claims, 7 Drawing Sheets

(56) References Cited

OTHER PUBLICATIONS

3GPP TS 29.212 V9.3.0 (Jun. 2010) "3rd Generation Partnership Project; Technical Specification Group Core Network and Terminals; Policy and Charging Control over Gx reference point (Release 9)" Jun. 2010—(Retrieved from the Internet: http://www.3pgg.org/ftp/Specs/archive/29_series/29.212/29212-930.zip).

3GPP TS 29.214 V9.2.0 (Dec. 2009) "3rd Generation Partnership Project; Technical Specification Group Core Network and Terminals; Policy and Charging Control over Rx reference point (Release 9)" Dec. 2009—(Retrieved from the Internet: http://www.3pgg.org/ftp/Specs/archive/29_series/29.214/29214-920.zip).

3GPP TS 29.215 V10.2.0 (Jun. 2011) "3rd Generation Partnership Project; Technical Specification Group Core Network and Terminals; Policy and Charging Control over S9 reference point, Stage 3 (Release 10)" Jun. 2011—(Retrieved from the Internet: http://www.3pgg.org/ftp/Specs/archive/29_series/29.215/29215-a20.zip).

3GPP TS 29.213 V8.12.0 (Sep. 2011) "3rd Generation Partnership Project; Technical Specification Group Core Network and Terminals; Policy and Charging Control signalling flows and Quality of Service (QoS) parameter mapping (Release 8)" Sep. 2011 (Jun. 2011)—(Retrieved from the Internet: http://www.3pgg.org/ftp1Specs/archive/29_series129.213129213-8c( ).zip).

3GPP TS 23.203 V8.3.1 (Sep. 2008) "3rd Generation Partnership Project; Technical Specification Group Core Network and Terminals; Policy and charging control architecture (Release 8)" Sep. 2008—(Retrieved from the Internet: http://www.quintillion.co.jp/3GPP/Specs/23203-831.pdf).

Network Working Group Request for Comments: 3588 (RFC3588) "Diameter Base Protocol" Sep. 2003 (Retrieved from the Internet: http://www.ietf.org/rfc/rfc3588.txt.pdf).

International Search Report relating to corresponding application PCT/CA2012/050732, issued on Jan. 25, 2013.

\* cited by examiner

ROAMING SESSION TERMINATION TRIGGERED BY ROAMING AGREEMENT/PARTNER DELETION

TECHNICAL FIELD

Various exemplary embodiments disclosed herein relate generally to telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, 3GPP TS 29.214, and 3GPP TS 29.215 describe the Policy and Charging Rules Function (PCRF), Policy and Charging Enforcement Function (PCEF), Bearer Binding and Event Reporting Function (BBERF) of the EPC, and Policy and Charging Control (PCC) Over S9 Reference Point. These specifications further provide some guidance as to how these elements interact in order to provide reliable data services and charge subscribers for use thereof.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN) for processing a change in a status of a roaming partner, the method including: receiving, at the PCRN, a message indicating a change in a status of the roaming partner; identifying roaming subscriber sessions associated with the roaming partner; determining home based roaming subscriber sessions among the identified subscriber sessions; marking the determined home based roaming subscriber sessions for termination; and sending a termination message to a policy and charging enforcement node for the determined home based roaming subscriber sessions.

Various exemplary embodiments relate to a method performed by a visited policy and charging rules node (PCRN) for processing a change in a status of a roaming partner, the method including: receiving, at the visited PCRN, a message indicating a change in a status of the roaming partner; determining visited based roaming subscriber sessions among the identified subscriber sessions; marking the determined visited based roaming subscriber sessions for termination; and sending a termination message to a visited policy and charging enforcement node for the determined visited based roaming subscriber sessions.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
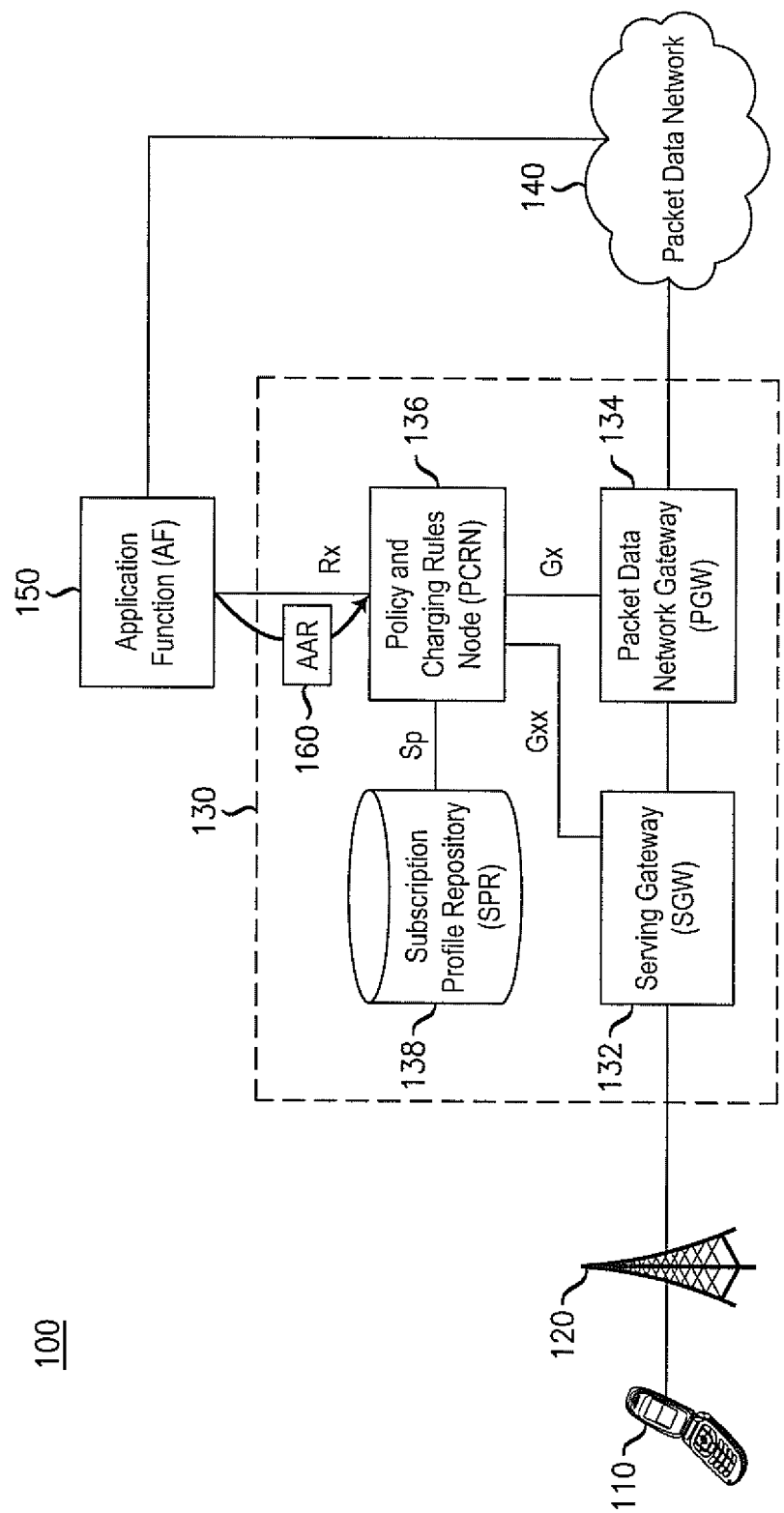
FIG. 1 illustrates an exemplary subscriber network for providing various data services.

When a subscriber roams onto a roaming network, a connection may be made between a visited policy and charging rule node (PCRN) and a home PCRN to control the usage of the visited and home network by the subscriber. The subscriber's ability to roam on visited networks depends on roaming agreements between network providers. These roaming agreements may specify various operating parameters for a subscriber when roaming on the visited network of the roaming partner. A roaming agreement may be between two or more network partners. When roaming agreement is deleted, a roaming partner is deleted, or a roaming partner is removed from a roaming agreement, existing sessions may need to be terminated. In view of the foregoing, it would be desirable to provide a method of terminating sessions on both home and visited networks when a change occurs in a roaming relationship between two partner networks.

Referring now to the drawings, in which like numerals refer to like components or steps, there are disclosed broad aspects of various exemplary embodiments.

FIG. 1 illustrates an exemplary subscriber network 100 for providing various data services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 140, and application function (AF) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. GW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Policy and charging rules node (PCRN) 136 may be a device or group of devices that receives requests for application services, generates PCC rules, and provides PCC rules to the PGW 134 and/or other PCENs (not shown). PCRN 136 may be in communication with AF 150 via an Rx interface. As described in further detail below with respect to AF 150, PCRN 136 may receive an application request in the form of an Authentication and Authorization Request (AAR) 160 from AF 150. Upon receipt of AAR 160, PCRN 136 may generate at least one new PCC rule for fulfilling the application request 160.

PCRN 136 may also be in communication with SGW 132 and PGW 134 via a Gxx and a Gx interface, respectively. PCRN 136 may receive an application request in the form of a credit control request (CCR) (not shown) from SGW 132 or PGW 134. As with AAR 160, upon receipt of a CCR, PCRN may generate at least one new PCC rule for fulfilling the application request 170. In various embodiments, AAR 160 and the CCR may represent two independent application requests to be processed separately, while in other embodiments, AAR 160 and the CCR may carry information regarding a single application request and PCRN 136 may create at least one PCC rule based on the combination of AAR 160 and the CCR. In various embodiments, PCRN 136 may be capable of handling both single-message and paired-message application requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AF 150. Packet data network 140 may further provide, for example, phone and/or Internet service to various user devices in communication with packet data network 140.

Application function (AF) 150 may be a device that provides a known application service to user equipment 110. Thus, AF 150 may be a server or other device that provides, for example, a video streaming or voice communication service to user equipment 110. AF 150 may further be in communication with the PCRN 136 of the EPC 130 via an Rx interface. When AF 150 is to begin providing known application service to user equipment 110, AF 150 may generate an application request message, such as an authentication and authorization request (AAR) 160 according to the Diameter protocol, to notify the PCRN 136 that resources should be allocated for the application service. This application request message may include information such as an identification of the subscriber using the application service, an IP address of the subscriber, an APN for an associated IP-CAN session, and/or an identification of the particular service data flows that must be established in order to provide the requested service. AF 150 may communicate such an application request to the PCRN 136 via the Rx interface.

Figure 2:
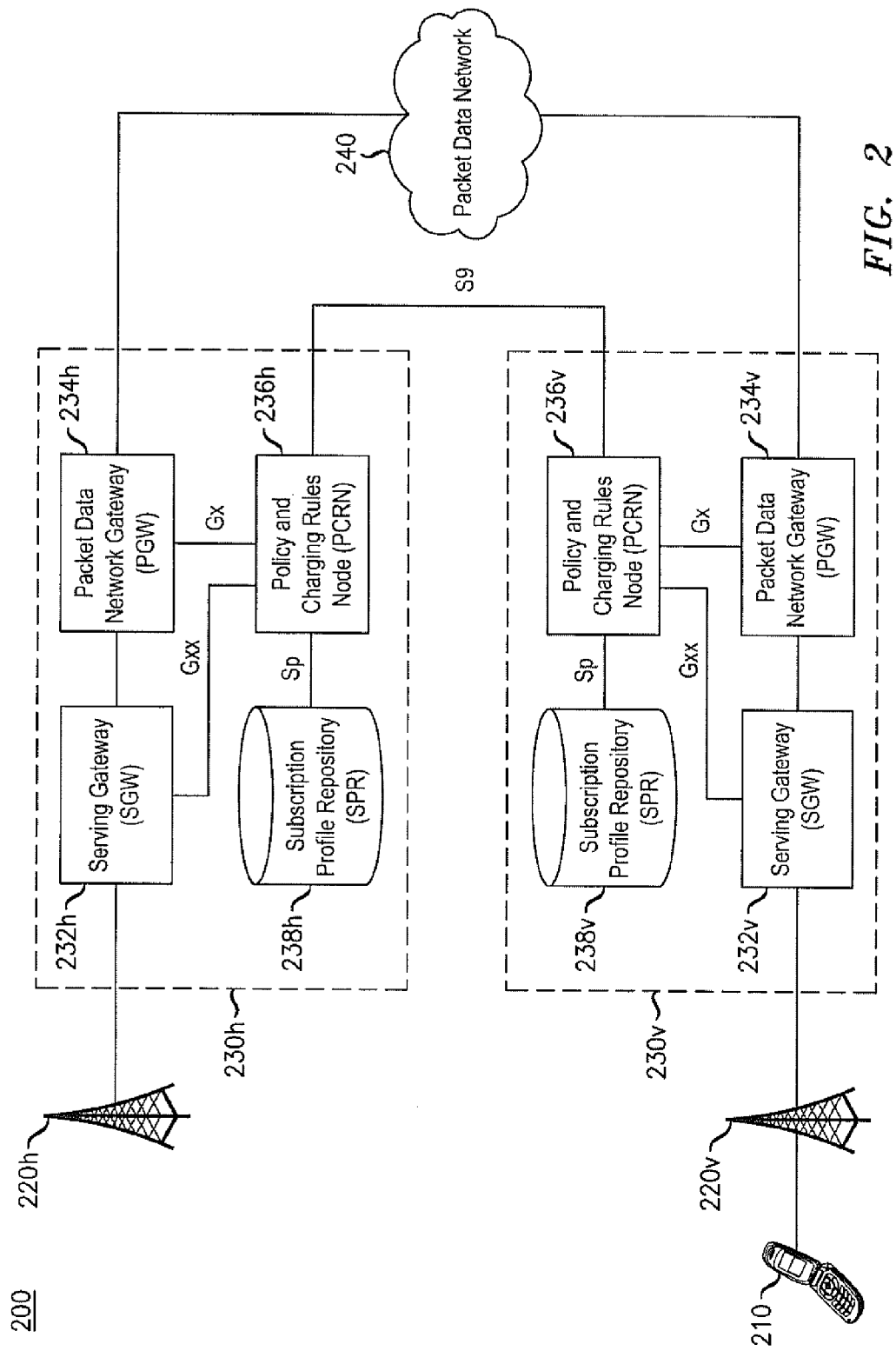
FIG. 2 illustrates an exemplary subscriber network 200 for providing roaming access to various data services.

FIG. 2 illustrates an exemplary subscriber network 200 for providing roaming access to various data services. Exemplary subscriber network 200 may correspond to exemplary network 100. EPC 230v may provide visited access to packet data network 240 for roaming UEs such as UE 210, whereby traffic associated with UE 210 flows through SGW 232v and PGW 234v. In various embodiments, EPC 230v and EPC 230h may connect to the same packet data network 240 (as shown) or may connect to two independent networks (not shown). Alternatively or additionally, EPC 230v may provide home-routed access to packet data network 240 for roaming UEs such as UE 210, whereby traffic associated with UE 210 flows through SGW 232v and PGW 234h. Accordingly, SGW 232v may be in communication with PGW 234h. Likewise, SGW 232h may be in communication with PGW 234v, such that EPC 230h may provide similar access to other roaming UEs (not shown) attached to base station 220h.

UE 210 may be in communication with a base station 220v but outside the range of base station 220h. Base station 220v, however, may not connect to a home public land mobile network (HPLMN) for the UE 210. Instead, base station 220v may belong to a visited public land mobile network (VPLMN) of the UE 210 and, as such, may not have access to various data associated with the UE 210, a subscriber associated therewith, and/or other data useful or necessary in providing connectivity to UE 210. For example, SPR 238v may not include information associated with UE 210; instead, such information may be stored in SPR 238h. To enable the provision of service based on subscriber information stored in SPR 238h, PCRN 236v may communicate with PCRN 236h via an S9 session.

In various embodiments, PCRN 236v may forward requests associated with UE 210 to PCRN 236h via an S9 session. PCRN 236h may process these messages to, for example, generate PCC and/or QoS rules. PCRN 236h may then forward these rules to PCRN 236v for installation on PGW 234v and/or SOW 232v. In the case of home-routed access, PCRN 236h may also install PCC rules directly on PGW 234h. In view of the cooperative nature of PCRNs 236h, 236v, these devices may be referred to as "partner devices" with respect to each other.

In various embodiments, each partner device may be capable of operating as a home device and a visited device. For example, if another roaming UE (not shown) were attached to base station 220h, PCRN 236h may be additionally capable of forwarding requests to PCRN 236v and PCRN 236v may be capable of returning appropriate rules to PCRN 236h for installation.

In establishing an S9 session, PCRNs 236h, 236v may be configured to negotiate a set of features that will be supported for the session. In various embodiments, PCRNs 236h, 236v may each be configured to perform this negotiation with respect to a default set of features such as, for example, the set of all features supported by the device. In such embodiments, the negotiated set of supported features may simply be the set of all features supported by both devices.

Figure 3:
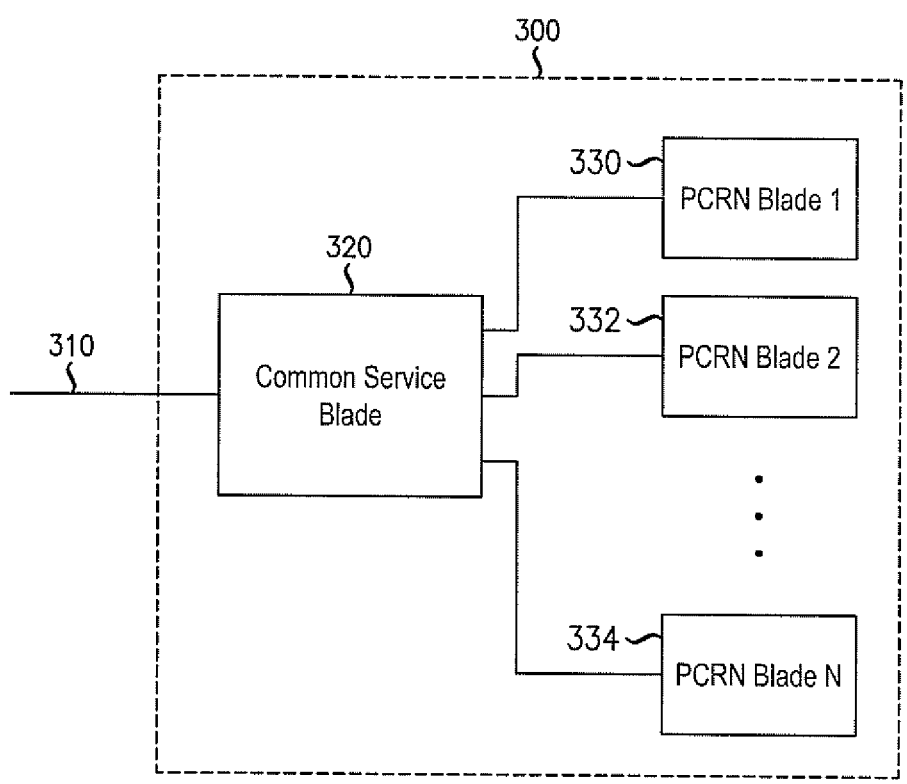
FIG. 3 illustrates an embodiment of a PCRN.

FIG. 3 illustrates an embodiment of a PCRN. The PCRN 300 may correspond to PCRN 136, PCRN 236h, or PCRN 236v. The PCRN 300 may include an interface 310, a common service blade (CSB) 320 and a plurality of PCRN blades 330, 332, and 334. The interface 310 may interface with various other nodes in the EPC 130 and may include various interfaces, for example, Sp, Rx, Gx, or Gxx. The PCRN blades 330, 332, and 334 may include all of the typical policy and rules functions that may be performed by a PCRN. The CSB 320 may implement a Diameter proxy agent (DPA) and other interface functions for the PCRN blades 330, 332, and 334. Further, some of the functionality for terminating sessions as described below may be implemented in the CSB 320. The CSB 320 and the PCRN blades 220, 332, and 334 may be servers, processors, or other computing hardware in combination with software to implement the functions that these devices may be tasked to carry out.

Figure 4:
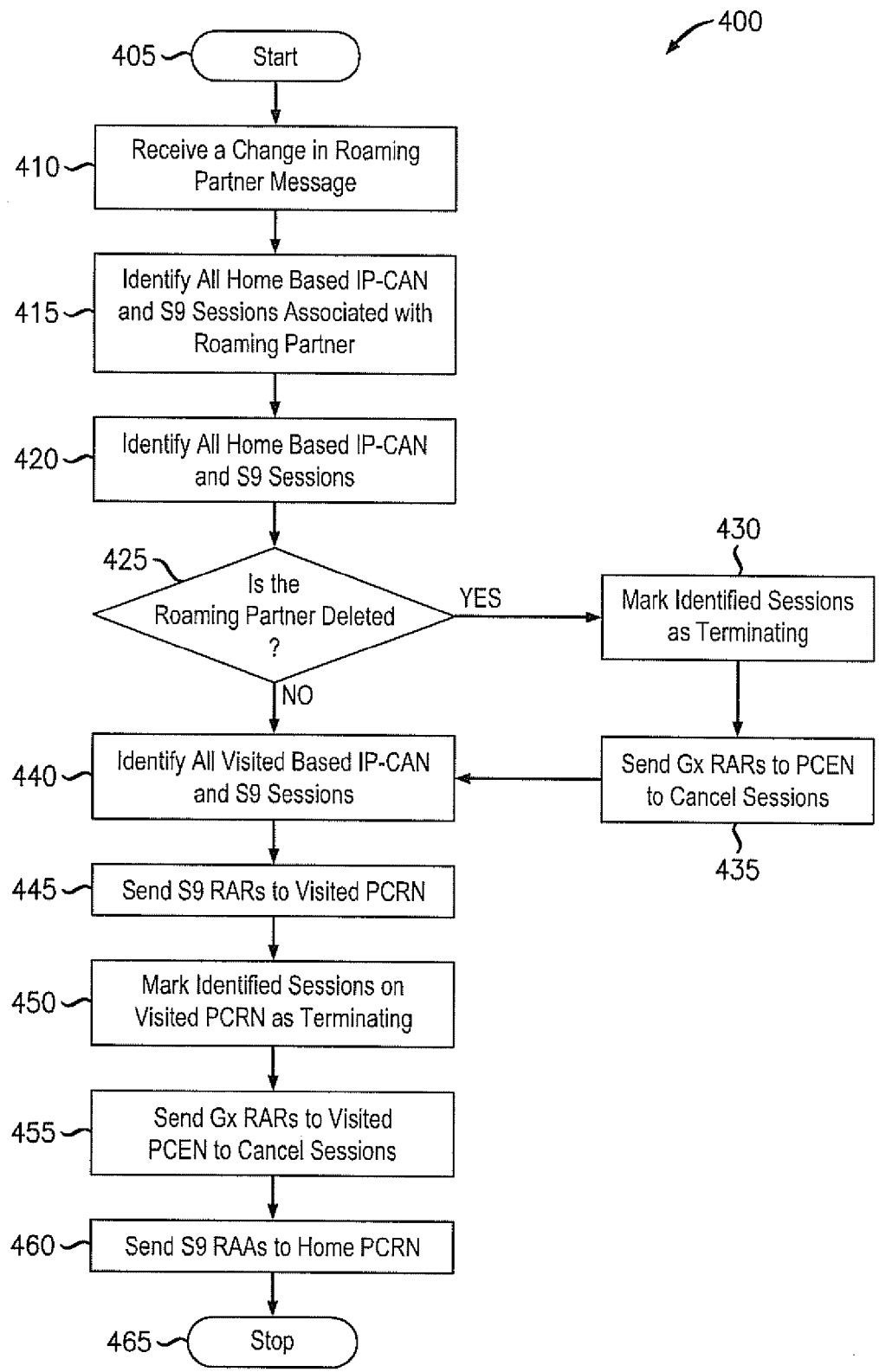
FIG. 4 is a block diagram illustrating a method for the termination of roaming sessions on a home PCRN.
Figure 5:
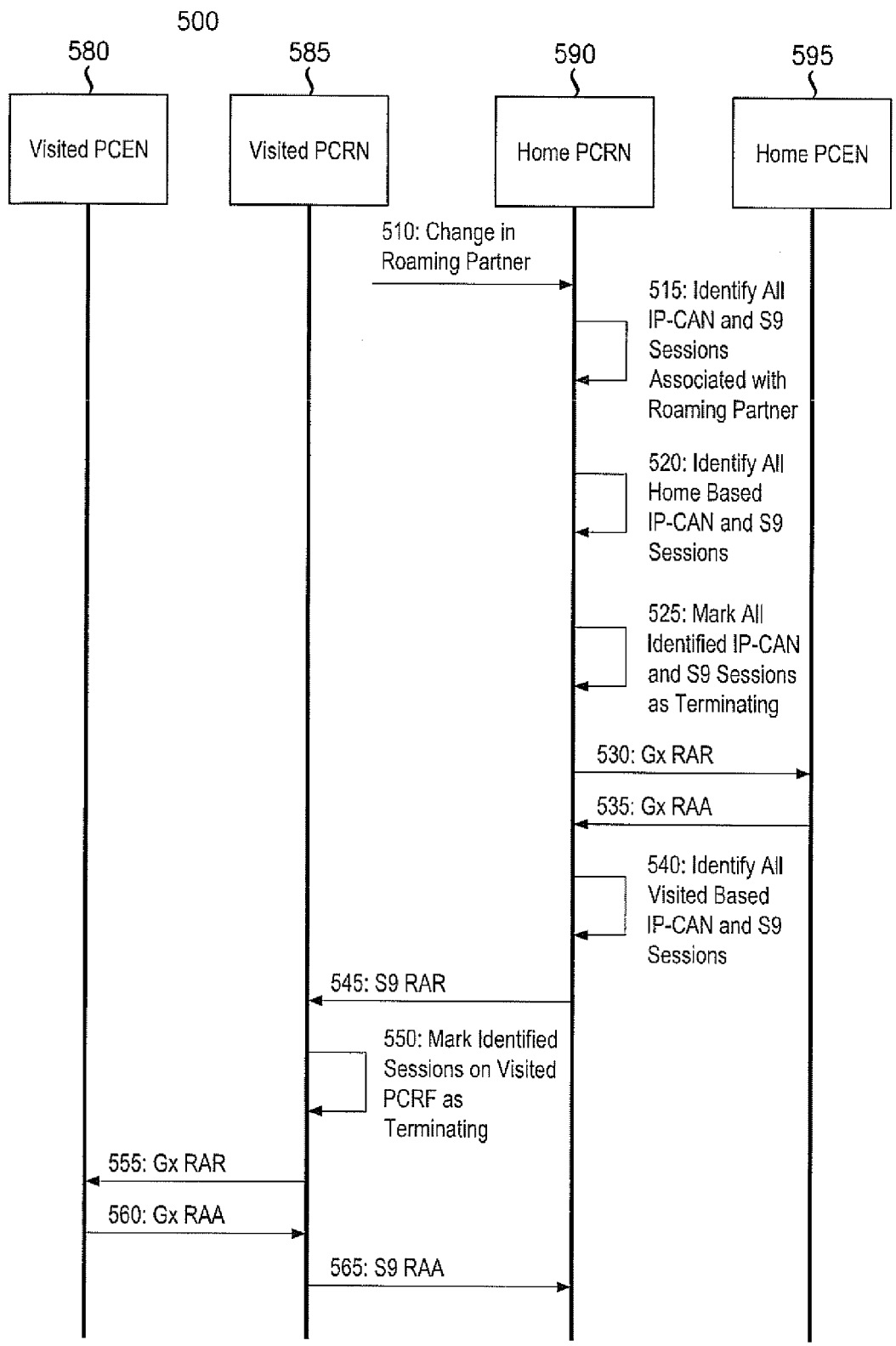
FIG. 5 is a diagram illustrating the flow of messages associated with the termination of roaming session on a home PCRN.

FIG. 4 is a block diagram illustrating a method for the termination of roaming sessions on a home PCRN. FIG. 5 is a diagram illustrating the flow of messages associated with the termination of roaming session on a home PCRN. The method 400 begins at 405. Next, the home PCRN 590 may receive a change in roaming partner message 410 and 510. The change in roaming partner message may indicate that a roaming partner has been deleted, that a roaming agreement has been deleted, or that a roaming partner has been removed from a roaming agreement. Next, the home PCRN 590 may identify all IP-CAN and S9 sessions associated with the roaming partner 415 and 515. If a roaming agreement is deleted then this step will include identifying sessions associated with all roaming partners identified by the deleted roaming agreement.

The home PCRN 590 may then identify all home based IP-CAN and S9 sessions 420 and 520. Home based IP-CAN and S9 sessions may be sessions that use the home PCEN 595 for the enforcement of policies and rules. Next, the home PCRN 590 may determine if the change in roaming partner message indicates that a roaming partner is deleted 425. If so, then the home PCRN 590 may mark the identified IP-CAN and S9 sessions as terminating 430 and 525.

If the change in roaming partner message did not indicate that a roaming partner is deleted, then the method may proceed to step 440.

Next, the home PCRN 590 may identify all visited based IP-CAN and S9 sessions 440 and 540. Visited based IP-CAN and S9 sessions may be sessions that use the visited PCEN 580 for the enforcement of policies and rules. The home PCRN 590 then may send S9 RAR messages over the S9 interface to terminate all the identified visited based IP-CAN and S9 sessions 445 and 545. This may occur in two steps where the S9 subsessions are first terminated, and then the S9 session is terminated once all of its subsessions are terminated. The visited PCRN 585 may then mark the identified visited IP-CAN sessions and S9 sessions as terminating 450 and 550. The visited PCRN 585 may then send Gx RARs to the visited PCEN 580 to cancel the identified visited IP-CAN sessions 455 and 555. The visited PCEN 580 upon termination of the sessions may send a Gx RAA message to the visited PCRN 585 indicating that the IP-CAN sessions have been terminated 560. Finally, the visited PCRN 585 may send S9 RAAs to the home PCRN indicating that the visited based IP-CAN sessions have been terminated.

While the home based IP-CAN sessions are marked for termination, the home PCRN 590 may continue to send and receive Gx and/or Gxx messages until the home PCEN 595 indicates that the IP-CAN session has been terminated. Similarly, the home PCRN 590 may continue to receive S9 messages related to the IP-CAN sessions marked as terminating until the home PCEN 595 indicates that the associated IP-CAN session has been terminated.

The home PCRN 590 may also continue to service IP-CAN and S9 sessions associated with roaming partners that have been removed from a roaming agreement or associated with deleted roaming agreements. Also, the home PCRN 590 may reject any new S9 session requests associated with a deleted roaming partner.

Figure 6:
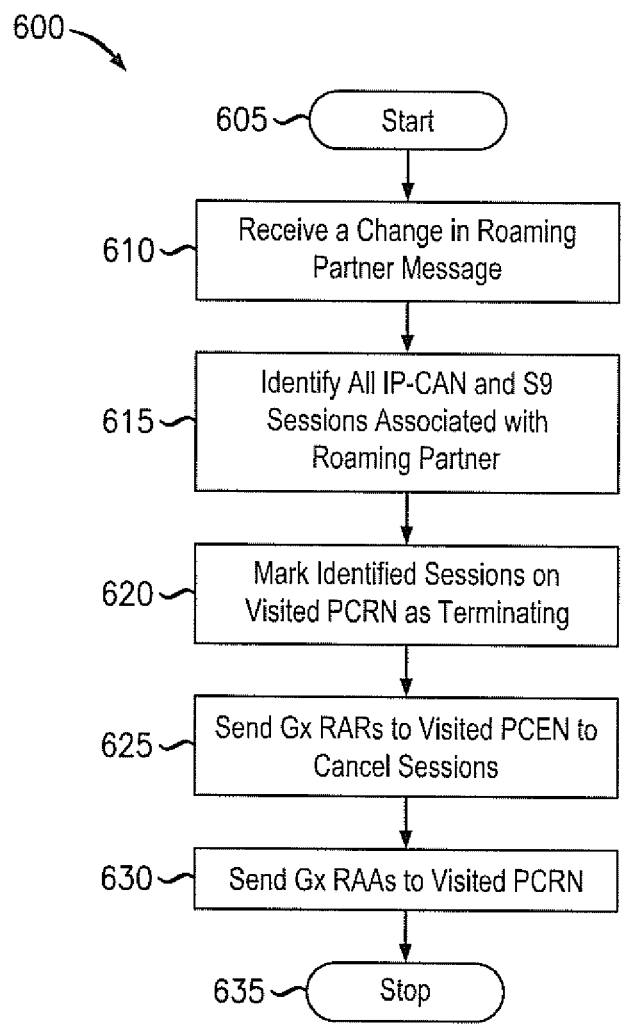
FIG. 6 is a block diagram illustrating a method for the termination of roaming sessions on a visited PCRN.
Figure 7:
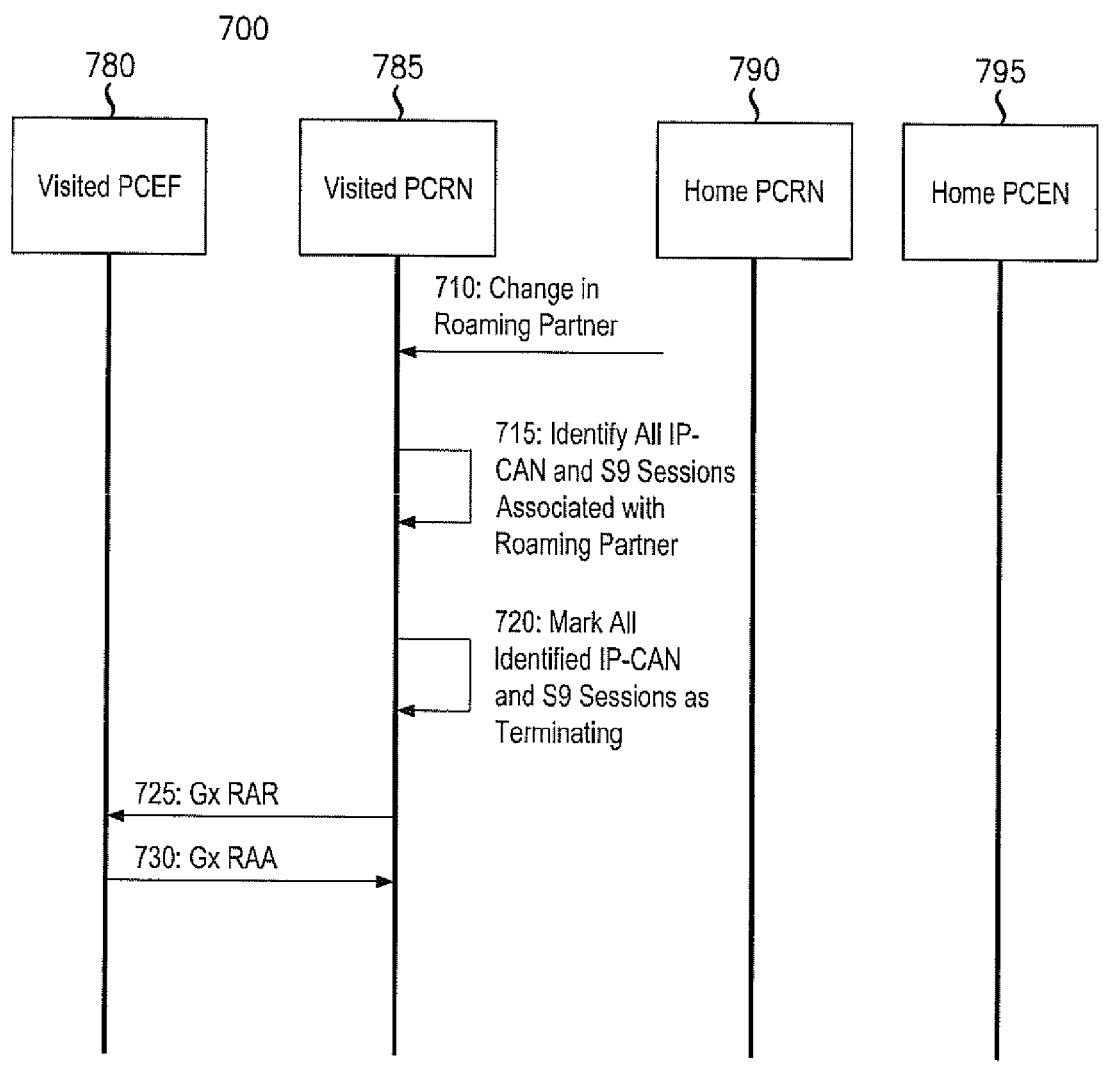
FIG. 7 is a diagram illustrating the flow of messages associated with the termination of roaming session on a visited PCRN.

FIG. 6 is a block diagram illustrating a method for the termination of roaming sessions on a visited PCRN. FIG. 7 is a diagram illustrating the flow of messages associated with the termination of roaming session on a visited PCRN. The method 600 begins at 605. Next, the visited PCRN 785 may receive a change in roaming partner message 610 and 710. The change in roaming partner message may indicate that a roaming partner has been deleted, that a roaming agreement has been deleted, or that a roaming partner has been removed from a roaming agreement. Next, the visited PCRN 785 may identify all IP-CAN and S9 sessions associated with the roaming partner 615 and 715. If a roaming agreement is deleted then this step will include identifying sessions associated with all roaming partners identified by the deleted roaming agreement.

Next, the visited PCRN 785 may mark the identified IP-CAN and S9 sessions as terminating 620 and 720. Now the visited PCRN 785 may send Gx RARs to the visited PCEN 780 to cancel the IP-CAN sessions marked as terminating 625 and 725. The visited PCEN 780 upon termination of the sessions may send a Gx RAA message to the visited PCRN 785 indicating that the IP-CAN sessions have been terminated 630 and 730.

While the visited based IP-CAN sessions are marked for termination, the visited PCRN 785 may continue to send and receive Gx and/or Gxx messages until the visited PCEN 780 indicates that the IP-CAN session has been terminated. Similarly, the visited PCRN 785 may continue to receive S9 messages related to the IP-CAN sessions marked as terminating until the visited PCEN 780 indicates that the associated IP-CAN session has been terminated.

Also, the visited PCRN 785 may reject any new S9 session requests associated with a deleted roaming partner, a roaming partner removed from a roaming agreement, or roaming partner associated with a deleted roaming agreement.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for processing a change in a status of a roaming partner, the method comprising:
   receiving, at the PCRN, a message indicating the change in the status of the roaming partner;
   identifying roaming subscriber sessions associated with the roaming partner;
   determining home based roaming subscriber sessions among the identified subscriber sessions;
   marking the determined home based roaming subscriber sessions for termination; and
   sending a termination message to a home policy and charging enforcement node for the marked home based roaming subscriber sessions.

2. The method of claim 1, further comprising:
   determining visited based roaming subscriber sessions among the identified roaming subscriber sessions; and
   sending a termination message to a visited PCRN for the determined visited based roaming subscriber sessions.

3. The method of claim 2, wherein the termination message sent to the visited PCRN is a S9 reauthorization request (RAR).

4. The method of claim 3, further comprising:
   receiving an S9 reauthorization answer (RAA) message from the visited PCRN indicating the termination of the determined visited based roaming subscriber sessions.

5. The method of claim 1, wherein the home roaming subscriber sessions include IP-CAN and S9 sessions.

6. The method of claim 1, wherein the termination message is a Gx reauthorization request (RAR).

7. The method of claim 1, further comprising:
   receiving a Gx message for a first marked home based subscriber session for termination; and
   sending a Gxx message for the first marked home based subscriber session in response to the Gx message.

8. The method of claim 7, further comprising:
   receiving a termination complete message for the first marked home based subscriber session.

9. The method of claim 1, further comprising:
   receiving a Gxx message for a first marked home based subscriber session for termination; and
   sending a Gx message for the first marked home based subscriber session in response to the Gxx message.

10. The method of claim 9, further comprising:
    receiving a termination complete message for the first marked home based subscriber session.

11. The method of claim 1, wherein the change in status of the roaming partner includes deletion of the roaming partner.

12. The method of claim 11, further comprising:
    rejecting any requests to establish any S9 sessions related to the deleted roaming partner.

13. A method performed by a visited policy and charging rules node (PCRN) for processing a change in a status of a roaming partner, the method comprising:
    receiving, at the visited PCRN, a message indicating the change in the status of the roaming partner;
    determining visited based roaming subscriber sessions among the identified subscriber sessions;

marking the determined visited based roaming subscriber sessions for termination; and sending a termination message to a visited policy and charging enforcement node for the marked visited based roaming subscriber sessions.

14. The method of claim 13, wherein the change in status of the roaming partner includes one of a deletion of the roaming partner, a deletion of a roaming agreement for the roaming partner, and a removal of the roaming partner from a roaming agreement.

15. The method of claim 13, wherein the visited based roaming subscriber sessions include IP-CAN and S9 sessions.

16. The method of claim 13, wherein the termination message is a Gx reauthorization request (RAR).

17. The method of claim 16, further comprising:
receiving a termination complete message for the first marked home based subscriber session.

18. The method of claim 13, further comprising:
rejecting any requests to establish any S9 sessions related to a roaming partner with a status change.

19. The method of claim 13, further comprising:
accepting a S9 message for a first marked visited based subscriber session for termination.

\* \* \* \* \*